(12) United States Patent
Mahavadi

(10) Patent No.: US 10,654,254 B2
(45) Date of Patent: May 19, 2020

(54) PROCESS OF MANUFACTURING HIGH QUALITY COMPOSITE MATERIALS USING AN ISO-STATIC HIGH PRESSURE REACTOR

(71) Applicant: Mahavadi Management and Technology Services GmBh, Stockelsdorf (DE)

(72) Inventor: Purushotham Mahavadi, Stockelsdorf (DE)

(73) Assignee: Mahavadi Management and Technology Services GmbH, Stockelsdorf (DE)

( * ) Notice: Subject to any disclaimer, the term of this patent is extended or adjusted under 35 U.S.C. 154(b) by 394 days.

(21) Appl. No.: 15/323,065

(22) PCT Filed: Jun. 30, 2015

(86) PCT No.: PCT/IB2015/054913
§ 371 (c)(1),
(2) Date: Dec. 29, 2016

(87) PCT Pub. No.: WO2016/001842
PCT Pub. Date: Jan. 7, 2016

(65) Prior Publication Data
US 2017/0190163 A1    Jul. 6, 2017

(30) Foreign Application Priority Data

Jun. 30, 2014    (IN) ............................ 3184/CHE/2014

(51) Int. Cl.
*B32B 37/10*    (2006.01)
*B29C 70/44*    (2006.01)
(Continued)

(52) U.S. Cl.
CPC .............. *B32B 37/10* (2013.01); *B29C 43/12* (2013.01); *B29C 70/44* (2013.01); *B32B 37/12* (2013.01);
(Continued)

(58) Field of Classification Search
CPC ..... B32B 37/10; B32B 37/12; B32B 2571/02; B32B 2605/00; C04B 41/4892; C04B 41/83; C08J 5/121; C08J 2377/10; B29C 70/44; B29C 43/12; F41H 5/0478; F41H 5/0435
See application file for complete search history.

(56) References Cited

U.S. PATENT DOCUMENTS

| 4,615,745 A | 10/1986 | Goransson |
| 5,051,226 A | 9/1991 | Brustad et al. |

(Continued)

FOREIGN PATENT DOCUMENTS

| WO | PCT/EP2008/001160 | 8/2008 |
| WO | PCT/AU2012/000820 | 1/2013 |

OTHER PUBLICATIONS

Patent Cooperation Treaty, International Search Report, dated Oct. 16, 2015, pp. 1-4, issued by the ISA/AT Austrian Patent Office.

(Continued)

*Primary Examiner* — Christopher T Schatz
*Assistant Examiner* — Cynthia L Schaller
(74) *Attorney, Agent, or Firm* — Grandhi Law Chambers; Krishna Grandhi

(57) ABSTRACT

A process of bonding different constituent materials of different tensile strengths in a single step in an isostatic high pressure reactor in order to produce a composite material.

4 Claims, 5 Drawing Sheets

Figure 2:
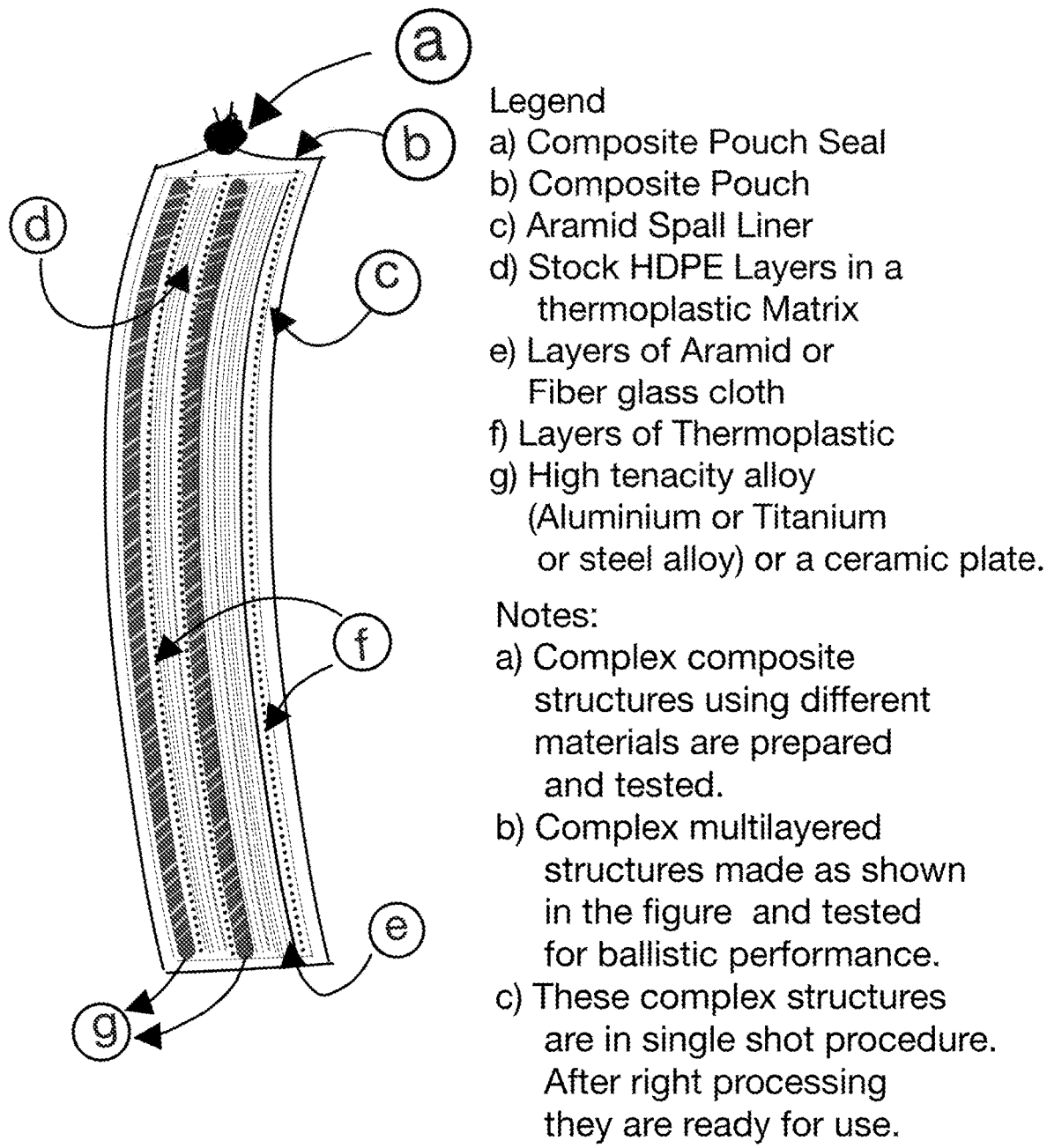

(51) Int. Cl.
*B32B 37/12* (2006.01)
*B29C 43/12* (2006.01)
*C04B 41/48* (2006.01)
*C04B 41/83* (2006.01)
*C08J 5/12* (2006.01)
*F41H 5/04* (2006.01)

(52) U.S. Cl.
CPC .......... *C04B 41/4892* (2013.01); *C04B 41/83* (2013.01); *C08J 5/121* (2013.01); *B32B 2571/02* (2013.01); *B32B 2605/00* (2013.01); *C08J 2377/10* (2013.01); *F41H 5/0428* (2013.01); *F41H 5/0435* (2013.01); *F41H 5/0478* (2013.01)

(56) References Cited

U.S. PATENT DOCUMENTS

| | | | |
|---|---|---|---|
| 5,131,834 A | | 7/1992 | Potter |
| 6,029,269 A | * | 2/2000 | El-Soudani .............. A42C 2/00 2/2.5 |
| 6,389,594 B1 | | 5/2002 | Yavin |
| 7,565,802 B2 | | 7/2009 | Bergman et al. |
| 7,628,001 B2 | | 12/2009 | Lönneborg |
| 7,632,454 B2 | | 12/2009 | Schlesser et al. |
| 8,414,677 B2 | | 4/2013 | Schlesser et al. |
| 8,628,821 B2 | | 1/2014 | Wang et al. |
| 8,642,122 B2 | | 2/2014 | Wang et al. |
| 2010/0170021 A1 | * | 7/2010 | Van Es ................ B29C 70/202 2/2.5 |
| 2013/0241100 A1 | * | 9/2013 | Lownsdale ............ B29C 70/12 264/101 |
| 2014/0161922 A1 | | 6/2014 | Thompson |
| 2015/0260483 A1 | * | 9/2015 | Wibby ................ F41H 5/0478 89/36.08 |

OTHER PUBLICATIONS

Patent Cooperation Treaty, Written Opinion of the International Searching Authority, dated Oct. 16, 2015, pp. 1-7, issued by the ISA/AT Austrian Patent Office.

* cited by examiner

Notes:
1. No need to evacuate the pouch.
2. The pouch can be an integral part of the end product.
3. Once the pouch is subjected to required pressure and temperature profile the composite panel is ready for use.
4. This is a single step process which includes the spall liner from the beginning.
5. The process reduces the time and provides uniform bonding.
6. No interruption of bonding process hens gives more strength to weight ratio.

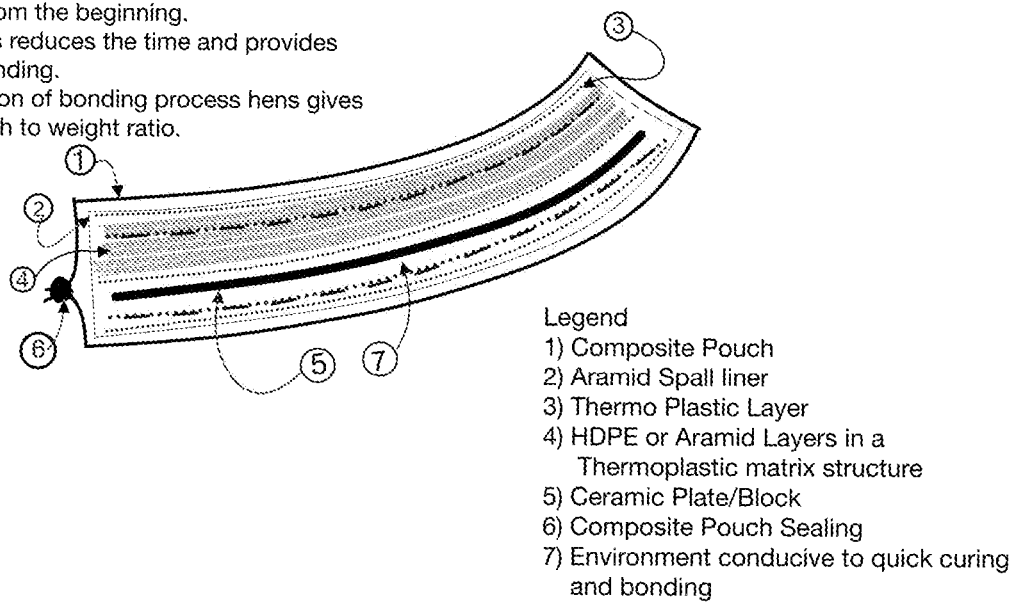

Legend
1) Composite Pouch
2) Aramid Spall liner
3) Thermo Plastic Layer
4) HDPE or Aramid Layers in a Thermoplastic matrix structure
5) Ceramic Plate/Block
6) Composite Pouch Sealing
7) Environment conducive to quick curing and bonding

FIG. 1

PROCESS OF MANUFACTURING HIGH QUALITY COMPOSITE MATERIALS USING AN ISO-STATIC HIGH PRESSURE REACTOR

FIELD OF THE INVENTION

Composite materials are those comprising of constituent materials with different physical and chemical properties. When two materials are reinforced, they combine to produce a material with properties different from the individual components. This material exhibits a number of physical and chemical properties such as lighter weight, higher strength, corrosion resistance, high impact strength, design flexibility, part consolidation, multidimensional stability, non-conductivity, non-magnetic, radar transparency, high durability and resistance to structural failure. Such materials may be corrosion resistant and can therefore also expose themselves to a broad range of chemicals such as acids, bases, solvents and chlorides etc.

Composite materials are largely used in the modern world in the field of aerospace engineering, automobile industry, infrastructure development, etc. An example would be the use of composite materials in the manufacturing of vehicles. Since one potential feature of composites is its lighter weight, most car manufacturers recommend that the body of the vehicle be developed using a composite material. The lighter the vehicle, the greater the fuel efficiency.

The composite stock consists of the various composite materials that are sought to be combined pre-cut, layered and arranged with positions that are relative to each other in such a manner that the desired properties of the ultimate composite material are achieved. The present invention relates to the field of developing a process of manufacturing composite materials in an Iso-static High Pressure Reactor. The temperature-pressure profiles of the High Pressure Reactor can be varied based on the composite material, which is being processed. Since there are two or more materials involved, a combination of different temperature and pressure profiles can be pursued in order to make an environment conducive to the formation and proper bonding of the different materials as composite material.

The presence of the hydraulic fluids and heat transfer oils helps in transferring the pressure and heat throughout the samples, thereby achieving uniform levels of pressure and temperature at a faster rate. The composite pouch can be defined as a sealable membrane which holds the composite material tightly together in a physical and chemical environment conducive to withstand high levels of temperature and pressure thereby facilitating the rapid curing of composite materials. The main function of the composite pouch is to isolate the composite stock from the hydraulic fluids and heat transfer oils present in the chamber. Certain additives such as chemicals, catalysts, catalystic meshes nano-powders, nano-abrasives and other materials required to achieve the desired properties of the consequent composite end product are added prior to sealing the composite pouch. The composite pouch may only be optionally removed towards the end of the process as it may form an integral part of the end product.

BACKGROUND AND PROBLEMS WITH THE PRIOR ART

Conventionally the manufacturing of composites would require a significant number of steps. In order to facilitate the proper bonding of two or more materials, (pressure and temperatures have to be applied under right chemical environment). There are a number of conventional methods by which composite materials can be manufactured and they involve the use of the following processes:

1) Primitive methods such as gluing, riveting or fusing different materials by applying adequate amount of force and heat
2) Conventional Axial Presses
3) Auto Claves (pressing two materials in an auto clave by means pressure in an gaseous medium)
4) Hydro Claves (pressing two materials in hydro clave by means of pressure in a fluid medium)
5) Vacuum Method (pressing two materials by means of differential pressure created by a vacuum. These two materials are bonded by means of a glue under vacuum pressure)

Axial presses are most commonly used in order to make composite structures where application of high pressure is required.

It is extremely difficult to bond two materials with different physical properties. A suitable example would be materials such as High Density Poly Ethylene and Ceramic. The High Density Poly Ethylene is soft and flexible in nature whereas the ceramic is hard and brittle in nature. These materials require a high amount of pressure in order to facilitate their bonding. Axial presses can withstand such high pressure, but they also possess a drawback as they can be used to manufacture only simple shapes and require costly tooling. The costly tooling required in the case of axial presses involves the use of stainless steel or other high strength materials; these materials and tool making is expensive. Further the method of bonding involves a multiple number of steps.

Auto claves are also used to manufacture complex shapes out of composite materials. However, this method of manufacture is limited to low pressure of up to 25 bar. This is a major disadvantage when compared to the present invention as the present invention can be used to fuse composite materials which require a higher degree of pressure and temperature.

Vacuum methods are employed in order to create a differential pressure for the production of composite materials. The primary drawback of this process is that the maximum pressure which can be applied is not more than 1 bar.

Hydroclaves are also employed in the manufacture composite materials. They require the use of a separating layer between the high pressure medium and the stock. This separating layer is a vacuum bag (which is also used in Vacuum methods and in Auto-Claves) within which the composite stock is placed. This separating layer or the vacuum bag has to be separated from the end product once the process is complete. The subject invention has two major advantages over the use of hydroclaves. The separating layer or the vacuum bag does not have to be completely evacuated after the stock is placed and it does not have to be separated from the end product once the process is complete as it can be used as an integral part of the end product.

The conventional methods of bonding composite materials can also withstand high pressure. However, such methods would require a multiple number of steps to manufacture them. The present invention facilitates the bonding or the fusing of composite materials through a single step mechanism within a high pressure isostatic pressure reactor by pursuing/applying temperature and pressure profile as desired. The single step is defined here as the single step of introducing the composite stock into the high pressure reactor for processing the stock within the reactor.

EP Pat 07003314 discloses a method for the manufacture of a ballistic-resistant molded article comprising of the following steps:
  a) Forming a stack by stacking 2 or more sheets comprising monolayers of unidirectional linear polyethylene fibers with an intrinsic viscosity of at least 8 dl/g measured in decalin at 135° C. and at most 30 Wt. % of a matrix material that consists of a thermoplastic polymer with a tensile modulus of at least 250 MPa, determined in accordance with ASTM D638, at 25° C., and whereby in the stack, the direction of the reinforcing fiber is at an angle α to the fiber direction in an adjacent monolayer,
  b) Providing Isostatic pressurizing means;
  c) Placing the stack in the Isostatic pressurizing means;
  d) Consolidating the stack, at an elevated temperature and a pressure of at least 10 MPa (100 bar) into the ballistic-resistant molded article.

Again this invention is limited to manufacturing ballistic resistant materials which would require a moderate amount of pressure. This prior art is mainly used for the manufacture of curved ballistic resistant materials. It utilizes the process of compression molding by which the consolidation of the constituent materials take place. The pressure is applied uniformly, but the drawback is that complex shapes of composite materials cannot be obtained using this process. Another important drawback is that once the consolidation is completed, the molded material has to be removed from the compression apparatus and further processed through mechanical techniques such as sawing, grinding and drilling. Methods of using Iso-Static Pressing to manufacture materials, while known, have not been applied to composite materials.

U.S. Pat. Nos. 8,628,122 and 8,628,821 discloses a method of forming a razor blade edge comprising: initially applying, by Isostatic Press (IP), of at least one polymeric material having an upper surface and a lower surface to at least one blade edge to form an iso statically-pressed coating on said at least one blade edge, wherein said iso statically-pressed coating ranges in thickness from about 10 nm to about 100 nm and wherein said razor blade is comprised of steel, Chromium (Cr), Diamond-like Carbon (DLC), Amorphous Diamond, or Chromium/Platinum (Cr/Pt).

In the above prior art, Iso-Static pressure has been applied to obtain a coating of a particular thickness on at least one end of the blade. It cannot be used to fuse materials as it lacks the presence of a pressurized chamber. Also it can only be used to create coatings which require a very moderate pressure of less than 100 bar.

U.S. Pat. No. 8,414,677 discloses a method of forming a dense, shaped article comprising at least about 95% by weight of a refractory material selected from a group consisting of carbides of tantalum, niobium or hafnium, nitrides of tantalum, niobium or hafnium, and alloys or powder mixtures thereof, wherein the article has a melting point of at least about 2900° C., a density of at least about 90%, a total porosity of no more than about 10%, and a total open porosity of no more than about 1.0%, wherein the article is a crucible adapted for use in crystal growth by physical vapor transport; and the crucible comprises a wall having a homogeneous structure across its thickness. U.S. Pat. No. 7,632,454 discloses a method of forming a dense, shaped article formed of a refractory material, comprising; providing a refractory material powder having a melting point of at least about 2900° C., the refractory material powder consisting of a refractory material selected from the group consisting of carbides of tantalum, niobium or hafnium, nitrides of tantalum, niobium or hafnium, and alloys or powder mixtures thereof; placing the refractory material powder in a mold configured to form the powder into a desired shape; treating the mold containing the powder at a temperature and pressure sufficient to form a self-supporting and shape-sustaining molded powder that conforms to the shape of the mold, wherein said treating step comprises applying an isostatic or uni-axial pressure; machining the shape-sustaining molded powder to further shape the molded powder; and sintering the shape-sustaining molded powder in an inert atmosphere at a pressure ranging from vacuum to about 10 atm, at a temperature and for a time sufficient to produce a dense shaped article having a density greater than about 90%, a total porosity of no more than about 10%, and a total open porosity of no more than about 1%. Both U.S. Pat. Nos. 8,414,677 and 7,632,454 utilize the principle of Iso-Static pressing, but does not involve the manufacturing of Composite materials.

U.S. Pat. No. 7,628,001 discloses a method for high pressure treatment of a product by means of an Isostatic press comprising a pressure chamber adapted to hold a first pressure medium, comprising the steps of: providing at least one closed container which holds a second pressure medium and a product whose temperature is below 0° C.; placing the container in the pressure chamber of the Isostatic press; pressurizing the pressure chamber by means of the first pressure medium; transferring a pressure change of the first pressure medium to the second pressure medium to subject the product held in the closed container to high pressure treatment; and keeping the temperature of the product below 0° C. throughout the high pressure treatment by absorbing heat which is generated by adiabatic temperature rise during the high pressure treatment.

In the case of the above patent, the temperature of the chamber has to be maintained at 0° Celsius and a pressure is created in one of the chambers which is transferred to the second chamber in order to subject the material to high pressure treatment. The drawback of this invention is that an artificial pressure has to be created using an Iso-static press which is transferred from one chamber to another chamber. This transferring of the pressure may not be uniform causing discrepancies within the final product. Further the temperature must necessarily be maintained at 0° C. while the pressure is being transferred from one chamber to another.

U.S. Pat. No. 4,615,745 discloses a method of reducing the porosity of a casting by subjecting the casting, in a heated state to isostatic pressure with a pressure medium, which method comprises locating the casting in a container, heating the container and the casting, thereafter placing the heated casting and surrounding container in a press chamber of a piston press, feeding a liquid pressure medium to the press chamber at a lower temperature than that of the container and casting, and applying pressure to the liquid pressure medium in the press chamber via the piston of the press, the container having at least one wall provided with a plurality of channels which allow the pressure medium to contact the casting, whereby the pressure medium extracts heat from the said at least one wall in passing through the channels into the interior of the said container. Even though a high pressure medium is being employed, the objective of the invention is to reduce the porosity of a casting using Iso-Static pressure whereas the objective of the present invention is to manufacture composite materials of physical and chemical properties significantly different from their constituent materials.

AU Patent 2011902721 discloses a method of manufacturing multi-layer articles containing processing liquid within a closed processing liquid filled circuit, a composite article process volume having an opening to facilitate loading and unloading, a pressurization system having means to increase or decrease the pressure within the closed processing liquid filled circuit, a process control system which includes a heating and cooling system. This invention has three major drawbacks. Firstly, the processing liquid used in this prior art is highly expensive silicone oil. Secondly, the processing liquid in this prior art is being circulated through circulation tubes in order to heat and cool the system so at to maintain a uniform temperature. At the end of the process, the sealable cover which in this case is the vacuum bag or the silicone bag, is removed from the end product and in order to do so, it has to be maintained at a pressure below atmospheric pressure. The silicone bag or the vacuum bag need to be evacuated before placing it in the high pressure medium.

It can be seen from the above-mentioned prior arts that there are a number of drawbacks to existing methods, which the subject invention will overcome. The subject invention involves the use of immersion heaters which heats the heat transfer oils and the hydraulic fluids internally thereby reducing the amount of energy and time required to achieve adequate levels of temperature. The surface of the immersion heater is designed in such a way that it acts as a heat exchanger and it transfers heat to the pressurizing medium within which the composite pouch is placed. The apparatus also comprises of another heat exchanger through which cold water is circulated. This heat exchanger facilitates cooling of the chamber by effectively carrying the excess heat away from the chamber during the cooling cycle and as and when required. Thus it helps in maintaining a uniform level of temperature throughout the process. The processing liquid i.e.; the heat transfer oil and hydraulic fluid is present in the chamber when the sample is introduced and there is no question of circulation involved in the subject invention.

Also the sealable cover is removed in the prior art, whereas in the present invention, it does not have to be removed and at the same time it can be an integral part of the end product protecting from environment.

The subject invention uses the principle of Iso-static pressing in a High Pressure Reactor to produce complex shapes of Composite Materials at required temperature and pressure. The subject invention involves the application of different pressure and temperature profiles as desired to the composite stock placed within the composite pouch. Certain additives such as chemicals, catalysts, catalystic meshes, nano-powders, nano-abrasives and other materials required to achieve the desired properties of the consequent composite end product are added prior to sealing the composite pouch. This would facilitate the optimal bonding of the materials within the composite pouch. At the end of the consolidation process, the composite material does not have to be subjected to mechanical techniques of sawing or grinding to obtain the desired final dimensions. The pressure is transferred uniformly throughout the chamber and the end product obtained would be free of all discrepancies caused by temperature and pressure differences.

OBJECTS OF THE INVENTION

The main object of the invention is aimed at overcoming the difficulties associated with the conventional methods of fusing composite materials. Such methods have a limited temperature-pressure profile within which they can operate and hence cannot be used to fuse composite materials of a higher, strength, hardness or flexibility.

Another main object of the invention is to reduce the number of steps required to fuse composite materials. i.e., a multi-step process to a single step process.

A further main object is to reduce the cost of manufacturing composite materials thereby increasing its efficacy.

Another main object is to fuse composite materials of complex temperature and pressure profiles which cannot be achieved using the conventional methods.

Another main object is to overcome the difficulties in bonding two or more different materials with inherent manufacturing tolerances associated with them.

A further main object is to manufacture composite materials of higher quality and that which exhibit stable physical and chemical properties.

Another main object is to manufacture composite materials of any shape and size which can be used in automobiles, aero planes etc.

A further main object is to overcome the discontinuity and weakness in the multistep process, which is observed in the conventional methods.

STATEMENT AND SUMMARY OF THE INVENTION

According to the invention there is, therefore provided a system, method, process and apparatus to enable the manufacture of high quality composite materials.

a) A primary mechanism and means to fuse or bond complex composite materials of different strengths, hardness and flexibility in a single step process by subjecting them to variable profiles of temperature and pressure.

b) An auxiliary mechanism and means to create complex shapes of composite material sandwich structures.

c) A mechanism and means to efficiently and easily bond composite materials of any size through a single step by placing the materials in a hydraulic chamber.

DETAILED DESCRIPTION OF THE INVENTION

The following describes the figures which have been incorporated in the section dealing with diagrams and flowcharts:

The figures and descriptions below pertain to selected examples, which are manufactured using the high pressure reactor process and tested. These examples have been included only to demonstrate the versatility of the high pressure reactor and the process.

FIG. 1 describes the preparation of a composite stock of Ceramic and HDPE (High Density Poly Ethylene) along with a suitable thermoplastic and spall liners for manufacturing a Composite Body Armor Panel. The spall liners prevent the splinters of ceramic from escaping and hurting the user when the ballistic projectile hits the surface of the composite panel. The Spall liner also stabilizes the ceramic from the front and prevents the ceramic from breaking if it falls down on a hard surface by mistake.

Figure 3:
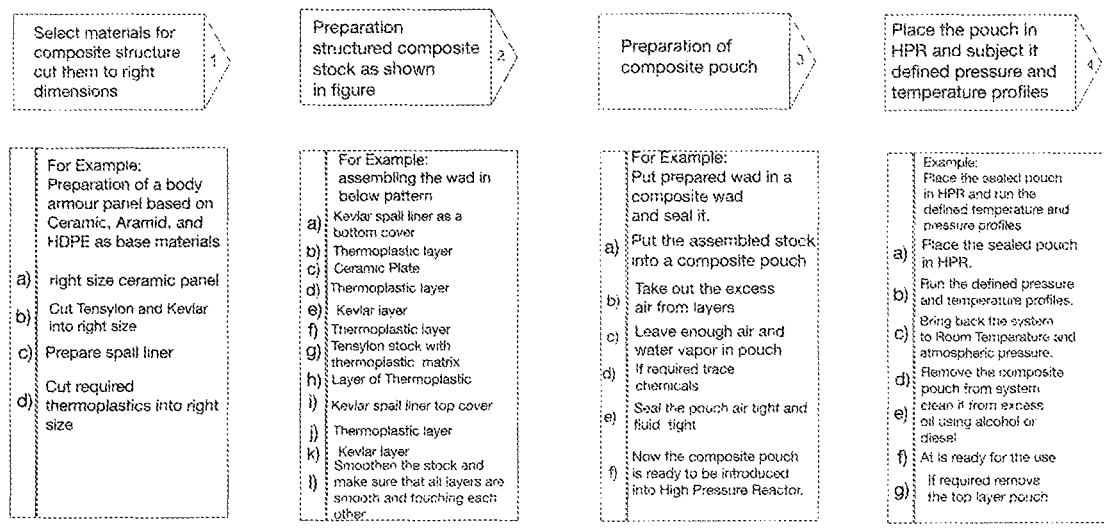

FIG. 2 describes the preparation of a Composite Panel using a High pressure Reactor. It is to be noted that the figure below is only an example and suitable materials have been used to to explain the process better. The constituent materials in the stock are arranged in the following order:

Aluminum-Aramid-HDPE-Aluminium-Aramid-HDPE. This is the composite stock which is then placed in the Composite pouch FIG. 3 describes a process flowchart of manufacturing armor using isostatic high pressure reactor.

Figure 4:
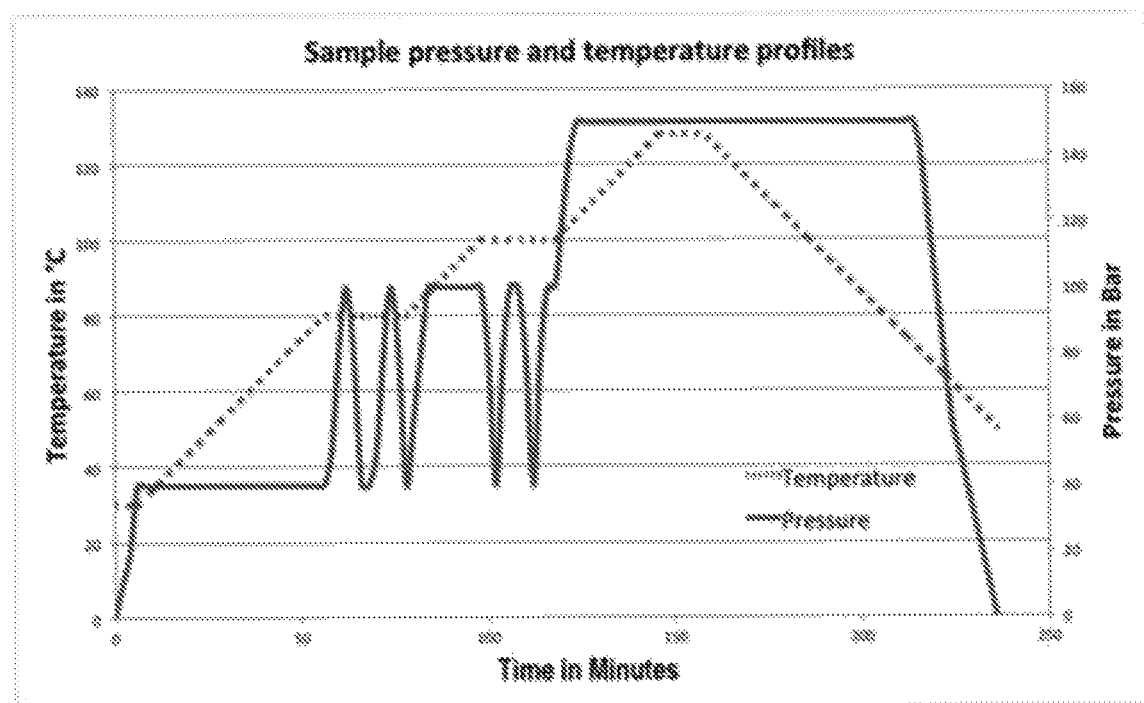

FIG. 4 is a graph which describes the temperature and pressure profiles applied to composite materials for a specific period of time. The materials which were used in the stock are Ceramic and High Density Polyethylene. The composite pouch is placed in the chamber. The composite pouch is subjected to different temperature and pressure profiles. The composites are subjected to pressure hammering when the heat applied to the composites are between the temperature range of 80° C. and 120° C. The pressure is increased at a constant rate. When the temperature reaches 130° C., it is subjected to a constant pressure of 150 bar for about 15 to 20 minutes. This process of exposing the composite pouch to a constant pressure at a high temperature is called soaking. The soaking of the Composite stock would help in achieving a desired temperature as required. The composite pouch has to be exposed to a constant pressure at a high temperature for a specific period of time and this is referred to as soak time. The soak time depends on the thickness of the sample introduced, the number of samples and the rate of heat transfer between the composite stocks and the medium.

Figure 5:
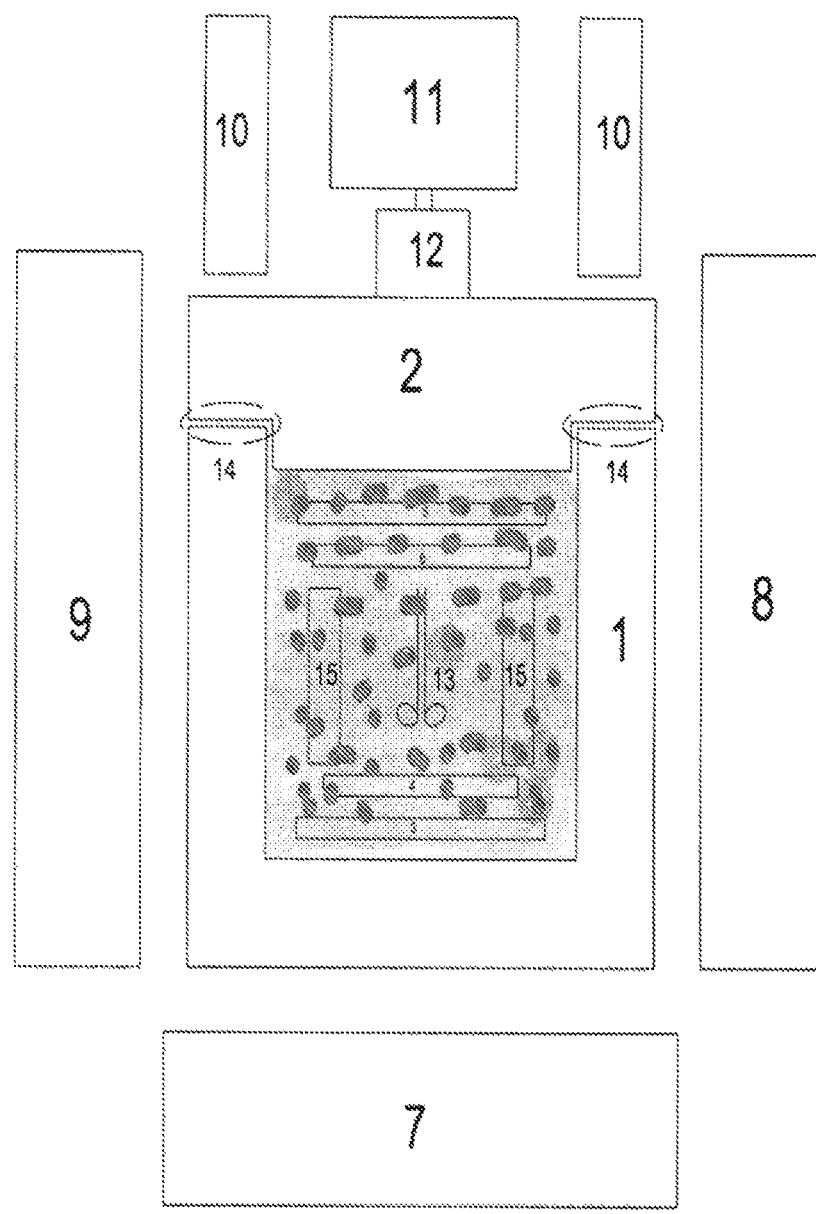

FIG. 5 describes the high pressure reactor describing the parts of the reactor individually. The following table describes the various components of the reactor with reference to the diagram in FIG. 5:

| S. No. | Name |
|---|---|
| 1 | High Pressure chamber |
| 2 | Lid/Platform/Opening and pressure holding cover |
| 3 | Heater Assembly |
| 4 | Heat exchanger |
| 5 | Cooler or chiller assembly |
| 6 | Cold pump or heat exchanger |
| 7 | Hydraulic Power Pack |
| 8 | Heating Control Unit |
| 9 | Cooling Control Unit |
| 10 | Lifting and holding of cover/lid/platform |
| 11 | Mixer Drive |
| 12 | Mechanical Feed through |
| 13 | High Pressure turbine cum mixer |
| 14 | High pressure sealing |
| 15 | Sample holder and sample cover |
| 16 | Special hydraulic and heat transfer fluids |

THE FOLLOWING IS A DETAILED DESCRIPTION OF THE INVENTION

The invention provides for a process of fusing composite materials of different shapes and sizes by placing them in an isostatic high pressure reactor and subjecting them to variable profiles of temperature and pressure.

The invention consists of the following parts:
Isostatic High Pressure Reactor
1. High pressure Chamber
2. Specially designed lid
3. Immersion heater assembly
4. Mixer turbine
5. Cooling assembly
6. Heat exchanger
7. Immersion heaters
8. Cold pump
9. Electric motor
10. Mechanical feed through
11. Sealant
Ancilliary Units:
12. Heater control unit
13. Cooler control unit
14. Hydraulic power pack
15. High pressure turbine cum mixer
16. Oil removers
Composite Materials and Additives:
1. Composite Pouch
2. Composite stock
   12(a) Flexible constituent material
   12(b) Rigid constituent material
   12(c) Thermoplastic material
3. Curing agent The constituent materials that may be used for bonding into a composite material may include both flexible and rigid materials. In many situations, the flexible material will need to be bonded to the rigid material in a configuration that seamlessly follows the contours of the rigid material.

The materials may consequently then need to be stacked in a pattern that is required to achieve the desired properties of the final composite end-product. At this stage, the application of a suitable bonding material is required to ensure initial cohesiveness of the constituent materials to each other. The bonding material may be a thermoplastic material or an adhesive, and may preferably be chosen from a range of commercially available thermoplastic materials such as Nolax—S22.2031™. The resultant arranged and temporarily bonded constituent materials are called the composite stock.

Certain additive components such as chemicals, catalysts, catalystic meshes nano-powders, nano-abrasives and other materials required to achieve the desired properties of the consequent composite end product are added to the composite stock, which is then sealed within a composite pouch.

The composite pouch is then sealed within a high-pressure isostatic chamber. The lid of the isostatic chamber is fitted with more than one high-temperature and pressure-resistant sealant O-rings designed to withstand pressure of up to 600 bars and temperatures of 160 degrees centigrade. The isostatic pressure is filled with a mixture of hydraulic fluids and heat transfer oils. The mixture of Hydraulic fluid and heat transfer oils helps to transfer the heat and pressure uniformly over the surface of the composite pouch. Hydraulic fluids of high viscosity are used in isostatic chambers in order to apply high pressure to the components therein. However, hydraulic fluids are insufficiently good conductors of heat for the purposes of efficient and uniform heat transfer to the components within the chamber. For this reason, heat transfer oils are added to the hydraulic fluids in order to achieve a fluid medium for application of uniform pressure and efficient transfer upon the surface of the composite stock. The hydraulic fluid requires a minimum ISO Viscosity Grade of 10-100 and may be selected from a list of any commercially available hydraulic fluid. The heat transfer oil used for efficient heat transfer may also be selected from any commercially available list of heat transfer oils, though, preferably hytherm 500™ is used.

The composite stock is then subjected to a process of variable pressure and temperature profiles for a period of time through a process known as pressure hammering. Once the composite stock (12) is prepared and placed in the composite pouch (11), it is then subjected to variable profiles of temperature and pressure. The flexible constituent material (12a) is then forced to adapt to the shape of the rigid constituent material (12b) under the influence of pressure.

The amount of time for which the composite stock will need to be subjected to pressure hammering will vary depending on the optimum temperature required to achieve the desired viscoelasticity of the flexible constituent material. At high pressure and temperature, the viscoelasticity of the flexible constituent material (12a) increases, thereby forcing the flexible constituent material (12a) to adapt to the shape of the rigid constituent material (12b). The materials are subjected to variable profiles of temperature and pressure depending on the type of the constituent materials (12a and 12b) in the composite stock (12) which are required to be fused together to produce a composite material.

After the pressure hammering is concluded, the pressure and temperature of the composite stock is increased and maintained so as to achieve the optimum bonding of the composite stock and to achieve a uniform temperature throughout all the surfaces of the composite stock. This period of time is called soak time. The temperature is reduced to allow the flexible component to fuse and bond with the rigid component and the pressure is maintained in order to allow layers to bond during the cooling phase. The temperature is then reduced to a predetermined value of less than 48 degrees centigrade and the composite pouch is removed. The composite pouch is preferably retained to form part of the bonded composite material.

Working Embodiment

A working embodiment of the invention for the purposes of preparing composite materials suitable for use in body armour is disclosed below:
1. A combination of constituent materials suitable for preparing composite body armour is selected and pre-cut into a suitable shape. In this instance, ceramic plate, Kevlar, tensylon stock and Kevlar spall liners may be used.
2. The constituent materials are then layered and assembled into a composite stock, with a layer of thermoplastic material such as Nolax S22.2031™ between each layer of constituent material. In this instance, the arrangement of constitutent materials and thermoplastic materials into a composite stock is as follows, with the first component at the bottom layer and the last component as the top layer:
   a. Kevlar spall liner
   b. Thermoplastic layer
   c. Ceramic plate
   d. Thermoplastic layer
   e. Kevlar layer
   f. Thermoplastic layer
   g. Tensylon stock with thermoplastic matrix
   h. Thermoplastic layer
   i. Kevlar spall liner
   j. Thermoplastic layer
   k. Kevlar layer
3. The resulting composite stock is then placed in a composite pouch and suitable additives are added to the composite stock. Excess air is removed from the composite pouch layers that are close to the stock layers, though some air and water vapour is retained within the pouch. The pouch is then sealed in a manner that renders it proof against fluid incursion or excursion.
4. The composite pouch is then introduced into the high-pressure isostatic chamber filled with a mixture of hydraulic fluids and heat transfer oils. The temperature in the chamber is then increased to 30 degrees centigrade and the pressure increased to 40 bars, where it is retained for a period of 60 minutes. 60 minutes after insertion, the composite pouch is then subjected to a pressure hammering process by series of temperature and pressure variations over a period of 60 minutes. 120 minutes after insertion, the pressure in the chamber is then increased to 150 bar and maintained for a period of 90 minutes, after which it is gradually reduced to 0 bar. 120 minutes after insertion, the temperature is gradually increased to 125 degrees centigrade for a period of 10 minutes and then gradually decreased to 45 degrees. The process of temperature and pressure variation over time within the isostatic chamber is illustrated using FIG. 4 in the drawings provided.
5. After the composite pouch is removed from the chamber, the composite pouch is retained and forms part of the bonded composite material.

I claim:
1. A process for bonding composite materials within a high-pressure isostatic reactor by applying variable profiles of temperature and pressure to said composite materials comprising the following steps:
   a) precutting two or more constituent materials, wherein one or more of the constituent materials is a flexible constituent material and one or more of the constituent materials is a rigid constituent material;
   b) stacking said constituent materials in patterns of layering and orientation along with a suitable bonding material such that the constituent materials and the bonding material form a composite stock;
   c) applying one or more additives to the composite stock;
   d) sealing the composite stock within a composite pouch;
   e) placing the composite pouch in the isostatic high pressure reactor;
   f) distributing pressure and temperature at a first level uniformly over a surface of the composite pouch by using a mixture of hydraulic fluids and heat transfer oils;
   g) subjecting the composite stock within the high-pressure isostatic reactor to a pressure-hammering process constituting a series of individual temperature and pressure variations over a period of time, including varying temperature within the isostatic reactor within a range bounded by a lower point of 35 degrees centigrade to an upper point of upto 120 degrees centigrade, and alternating pressure up-and-down within the isostatic reactor within a range bounded by a lower point of 0 bars to an upper limit of upto 100 bars, each individual variation lasting for an interval of time ranging between 2 minutes and 10 minutes, and the pressure-hammering process lasting for said period of time ranging between 15 minutes and 120 minutes;
   h) increasing pressure to a final value required to achieve optimum bonding of the composite stock and uniform temperature throughout all surfaces of the constituent materials within the composite stock, and maintaining pressure at said final value for a specific time period when the uniform temperature reaches a limit, wherein the specific time period is determined based on the thickness of the composite stock, the number of constituent materials and a rate of heat transfer between the constituent materials and the mixture of hydraulic fluids and heat transfer oils;
   i) reducing temperature of the composite stock while maintaining pressure at the first level specified in step (f) in order to ensure optimum bonding of the constituent materials within the composite stock and the formation of a bonded composite material;

j) removing the composite pouch from the isostatic high pressure chamber and cleaning said composite pouch; and k) retaining the composite pouch such that the composite pouch becomes an integral part of the bonded composite material.

2. The process as claimed in claim 1 wherein said additives are selected from the group consisting of catalysts, nano-powders and nano-abrasives.

3. A process for bonding composite materials within a high-pressure isostatic reactor by applying variable profiles of temperature and pressure to said composite materials comprising the following steps:

a) precutting two or more constituent materials, wherein one or more of the constituent materials is a flexible constituent material and one or more of the constituent materials is a rigid constituent material;

b) stacking said constituent materials in patterns of layering and orientation along with a suitable bonding material such that the constituent materials and the bonding material form a composite stock;

c) applying one or more additives to the composite stock;

d) sealing the composite stock within a composite pouch;

e) placing the composite pouch in the isostatic high pressure reactor;

f) distributing pressure and temperature at a first level uniformly over a surface of the composite pouch by using a mixture of hydraulic fluids and heat transfer oils;

g) subjecting the composite stock within the high-pressure isostatic reactor to a pressure-hammering process constituting a series of individual temperature and pressure variations over a period of time, including varying temperature within the isostatic reactor within a range bounded by a lower point of 35 degrees centigrade to an upper point of upto 120 degrees centigrade, and the alternating pressure up-and-down within the isostatic reactor within a range bounded by chamber may be varied from a lower point of 0 bars to an upper limit of upto 100 bars, each individual variation lasting for an interval of time ranging between 2 minutes and 10 minutes, and the pressure-hammering process lasting for said period of time ranging between 15 minutes and 120 minutes;

h) increasing pressure to a final value required to achieve optimum bonding of the composite stock and uniform temperature throughout all surfaces of the constituent materials within the composite stock, and maintaining pressure at said final value for a specific time period when the uniform temperature reaches a limit, wherein the specific time period is determined based on the thickness of the composite stock, the number of constituent materials and a the rate of heat transfer between the constituent materials composite stocks and the mixture of hydraulic fluids and heat transfer oils;

i) reducing temperature of the composite stock while maintaining pressure at the first level specified in step (f) in order to ensure optimum bonding of the constituent materials within the composite stock and the formation of a bonded composite material;

j) removing the composite pouch from the isostatic high pressure chamber and cleaning said composite pouch; and k) removing the composite pouch from the bonded composite material and applying a coating to a surface of the bonded composite material.

4. The process as claimed in claim 3 wherein said additives are selected from the group consisting of catalysts, nano-powders and nano-abrasives.

* * * * *